United States Patent
Ha

(10) Patent No.: US 7,590,209 B2
(45) Date of Patent: Sep. 15, 2009

(54) METHOD AND COMPUTER PROGRAM FOR IDENTIFYING A TRANSITION IN A PHASE-SHIFT KEYING OR FREQUENCY-SHIFT KEYING SIGNAL

(75) Inventor: Stephen Ha, Greenville, TX (US)

(73) Assignee: L3 Communications Integrated Systems L.P., Greenville, TX (US)

( * ) Notice: Subject to any disclaimer, the term of this patent is extended or adjusted under 35 U.S.C. 154(b) by 671 days.

(21) Appl. No.: 11/323,835

(22) Filed: Dec. 30, 2005

(65) Prior Publication Data

US 2007/0153947 A1    Jul. 5, 2007

(51) Int. Cl.
*H04L 7/00* (2006.01)
(52) U.S. Cl. ...................................................... 375/355
(58) Field of Classification Search ................ 375/269, 375/279, 362, 355, 308, 334; 708/5, 8, 21, 708/404; 327/141, 233–236
See application file for complete search history.

(56) References Cited

U.S. PATENT DOCUMENTS

| 3,069,654 | A |   | 12/1962 | Hough |         |
|-----------|---|---|---------|-------|---------|
| 4,093,941 | A | * | 6/1978  | Bryan et al. | 382/197 |
| 6,469,662 | B2 |  | 10/2002 | Tullson |       |
| 6,493,398 | B1 | * | 12/2002 | Erisman | 375/295 |
| 2003/0151542 | A1 | * | 8/2003 | Steinlechner et al. | 342/70 |

OTHER PUBLICATIONS

D. T. Liley, *The Radon Transform*, http://marr.bsee.swin.edu.au/~dtl/het406/backproj/node2.html, 1998.

R. H. Tataham, *Multidimensional filtering of seismic data*, Proc. IEEE, vol. 72, 1984, 1357-1369.

M. van Ginkel, C. L. Luengo Hendriks and L. J. van Vliet, *A Short Introduction to the Radon and Hough Transforms and How They Relate to Each Other*, Technical Report QI-2004-01, Quantitative Imaging Group, Delft University of Technology, Febryary 2004, 1-11.

J. Tsui, *Digital Techniques for Wideband Receivers*, SciTech Publishing, Inc. 2nd Edition, 2004, Chapter 10.

W. H. Press, S. A. Teukolsky, W. T., Vetterling and B. P. Flannery, Numerical *Recipes in C*, Cambridge University Press, 1992, section 15.2.

B. Watson, *FSK: Signals and Demodulation*, http://www.wj.com/pdf/technotes/FSK_signals_demod.pdf, 1980.

* cited by examiner

*Primary Examiner*—David C Payne
*Assistant Examiner*—Rahel Guarino
(74) *Attorney, Agent, or Firm*—Hovey Williams LLP

(57) ABSTRACT

A system for identifying phase transitions in phase-shift keying signals and frequency transitions in frequency-shift keying signals broadly comprises a memory and a computing element capable of: selecting a portion of the signal to analyze, wherein the signal comprises a plurality of data samples; applying a transform to the signal to obtain a frequency spectrum; determining a maximum frequency spectrum corresponding to a carrier frequency; determining a starting approximation value of a slope of the phase transition; calculating a bounded limit of slopes within which to search for the phase transition; selecting a plurality of lines, calculating a sum for the data samples associated with each of the lines; and based on the sum for the data samples, identifying a line that corresponds to a location of the phase transition.

14 Claims, 12 Drawing Sheets

METHOD AND COMPUTER PROGRAM FOR IDENTIFYING A TRANSITION IN A PHASE-SHIFT KEYING OR FREQUENCY-SHIFT KEYING SIGNAL

BACKGROUND OF THE INVENTION

1. Field of the Invention

The present invention relates to signal processing. More particularly, the invention relates to identification and recognition of particular features of signals or, more specifically, phase and frequency transitions within a signal.

2. Description of the Prior Art

Signal extraction is an increasingly growing field of signal processing that calls for recognition of certain events in a received signal. The event may be a particular pattern, or, as in the present invention, a signal or a portion thereof having a certain feature, such as a phase transition. Often, little is known about the received signal prior to receipt. In the present invention, it is specifically desired to know the existence of any phase transitions or frequency transitions contained within the signal. A phase transition is where the phase changes abruptly and either decreases or increases relative to a previous portion of the signal. Similarly, a frequency transition is where the frequency shifts, which is usually where the phase transitions. Recognition of phase transitions can be specifically problematic due to the short length of phase transitions, such that few data samples are associated with the phase transition, and the fact that noise often masks the phase transition. Data spikes and outliers also tend to skew the data or otherwise make signal extraction difficult.

Because the data samples associated with a phase transition may be very few, a technique that considers outlying data samples that deviate from the norm of the data samples associated with the phase transition tends to skew or otherwise exert heavy influence on the final extracted image. One prior art method of recognizing or extracting the phase transition is the zero-crossing method, which is discussed in J. Tsui, *Digital Techniques for Wideband Receivers*, SciTech Publishing, Inc., 2nd ed. 2004, Chpt. 9. The zero-crossing method is problematic, however, because it does not ignore or otherwise take into account outliers. Because the outliers are considered when extracting an image, the final extracted image may be inaccurate or otherwise negatively influenced.

A technique that considers too many data samples may be equally problematic, in that data samples outside the phase transition (or outside a zone around the phase transition) may introduce a negative influence. This is because such data samples may improperly contribute to the final extracted image.

Other prior art methods include a delta phase method, also discussed in *Digital Techniques* at page 330. FIG. 1, which is denoted as "prior art," illustrates unwrapped phase values in the top graph and the average delta phase in the bottom graph. The delta phase method described in *Digital Techniques* computes the phase transition from the unwrapped phase. The delta phase is the next phase minus the present phase. To smooth the result, an average is obtained from four delta phases. Four is chosen so that it produces the best smoothing without compromising the resolution. A higher number gives a smoother result but broadens the peak. The absolute value of the average delta phase is shown, i.e., with the negative values rectified. Additionally, the DC level of the average delta phase is removed.

FIG. 2, also denoted as "prior art," illustrates the unwrapped phase values in the top graph and a magnified result of the average delta phase method described in *Digital Techniques*. The plot of the bottom graph of FIG. 2 shows a broad peak and a less well-defined start and end of the phase transition.

Accordingly, there is a need for an improved method and computer program that overcomes the limitations of the prior art. More particularly, there is a need for a method and computer program that is not sensitive to outliers or an excessive number of data samples. There is further a need for a method and computer program operable to accurately extract phase transitions while ignoring noise that tends to degrade the extracted image.

SUMMARY OF THE INVENTION

The present invention solves the above-described problems and provides a distinct advance in the art of signal processing. More particularly, the present invention provides a method and computer program operable to extract a phase transition from a phase-shift keying ("PSK") signal or a frequency transition from a frequency-shift keying ("FSK") signal.

As noted below, the present invention will be discussed specifically with respect to extracting a phase transition from a PSK signal. However, the present invention can also be used to extract a frequency transition from an FSK signal, and such will be described further below.

With respect to extracting a phase transition from a PSK signal, the method and computer program of the present invention broadly comprises the steps of selecting a portion of the signal to analyze based on an independent variable, wherein the signal comprises a plurality of data samples; applying a Fast-Fourier Transform ("FFT") to the signal to obtain the frequency spectrum; determining a maximum signal corresponding to a carrier frequency; mixing the carrier frequency so as to translate the carrier frequency to a low frequency; determining an approximate value of a slope of the phase transition; determining a bounded limit of slopes within which to search for the phase transition; selecting a plurality of lines, each having a slope within the bounded limit and an initial value, where each line passes through at least one of the data samples; calculating a sum for the data samples associated with each of the lines; and based on the sum for the data samples, identifying the line that corresponds to a location of the phase transition.

The present invention thus allows for very accurate recognition of a short and abrupt phase transition that may otherwise be masked by noise. In particular, the present invention recognizes that phase transitions have a pseudo-linear form. With this knowledge, a Radon transform may be applied to a small number of data samples corresponding to phase values to obtain an accurate extraction of the phase transition. Similarly, application of the present invention allows for extraction of frequency transitions.

BRIEF DESCRIPTION OF THE DRAWING FIGURES

A preferred embodiment of the present invention is described in detail below with reference to the attached drawing figures, wherein.

Figure 1:
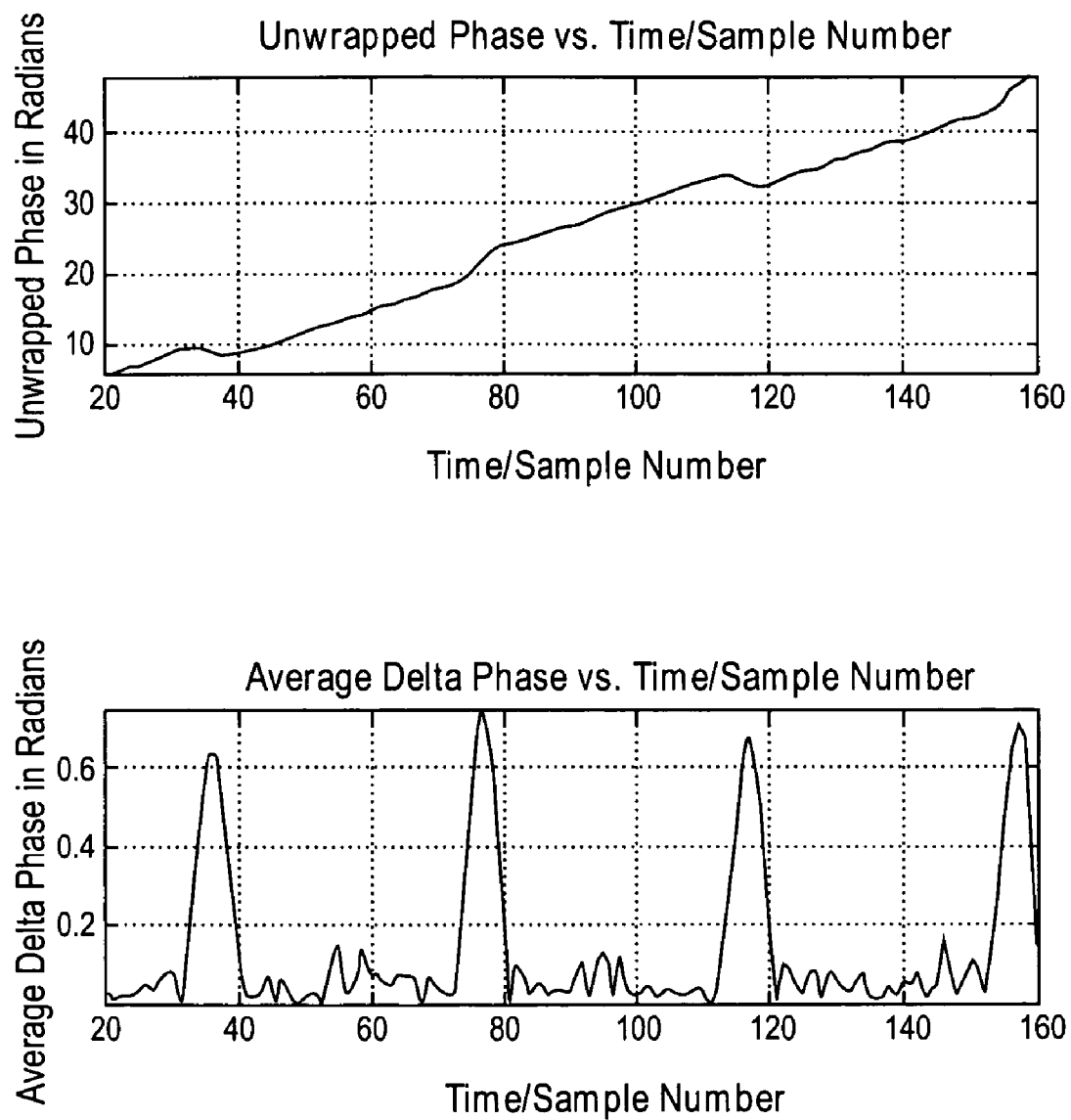
FIG. 1 illustrates a graph of unwrapped phase values and a graph of a phase transition obtained by application of a prior art average delta phase method.
Figure 2:
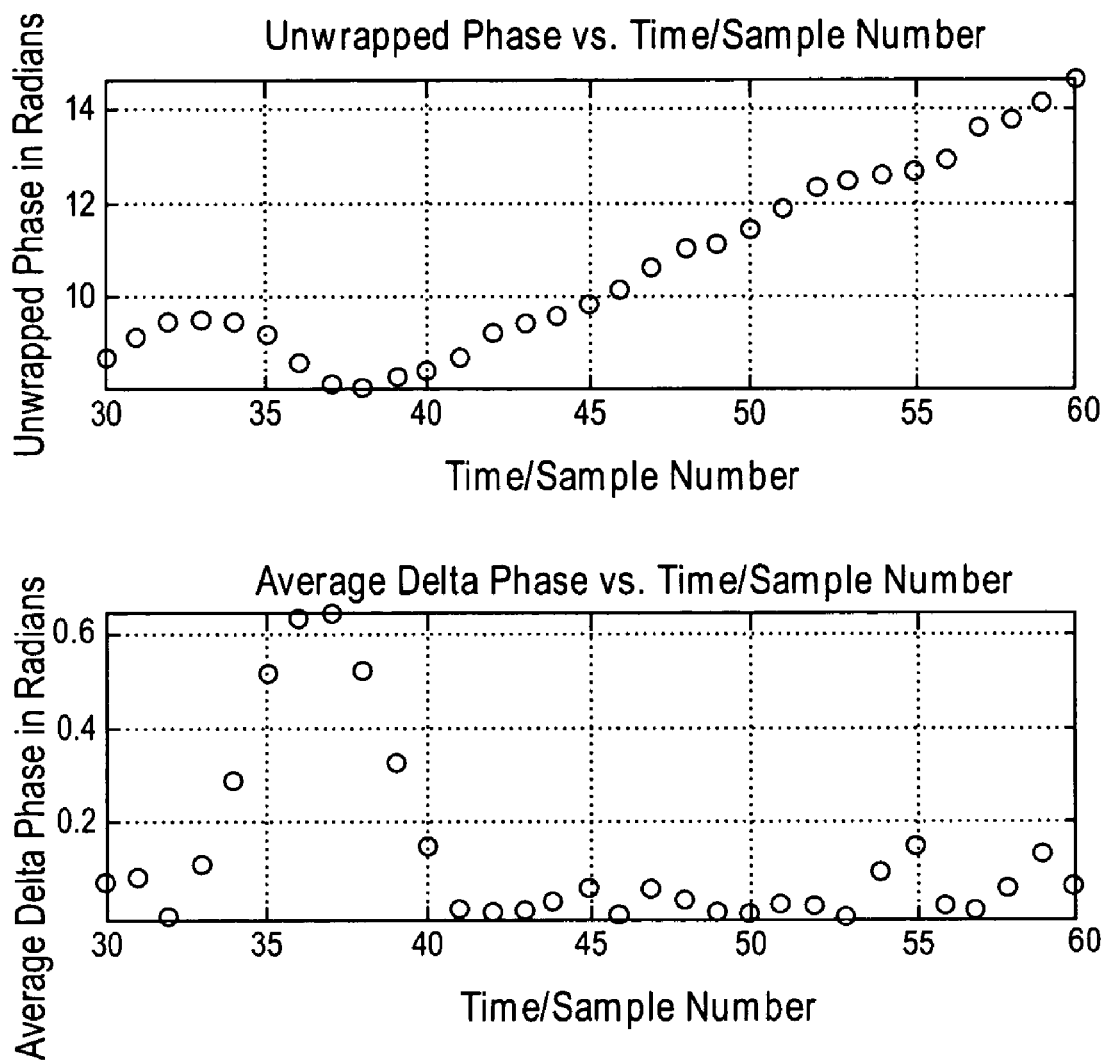
FIG. 2 illustrates the unwrapped phase values of FIG. 1 and a plot of the phase transition obtained by the prior art delta phase method.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present invention is operable to detect, recognize, extract, or otherwise identify one or more phase transitions in a phase-shift keying ("PSK") signal or one or more frequency shifts in a frequency-shift keying ("FSK") signal. As is well known in the art, a PSK signal changes or modulates a phase of a carrier wave. Similarly, an FSK signal shifts a frequency between predetermined values. Because PSK and FSK signals have similar features in that a known parameter is modulated or shifted, for ease of reading, the following description of the present invention will discuss PSK signals only. However, it is understood that the present invention can also similarly be used and applied to FSK signals or any other type of signal with a known shift, change, or modulation, as further described below.

Figure 3:
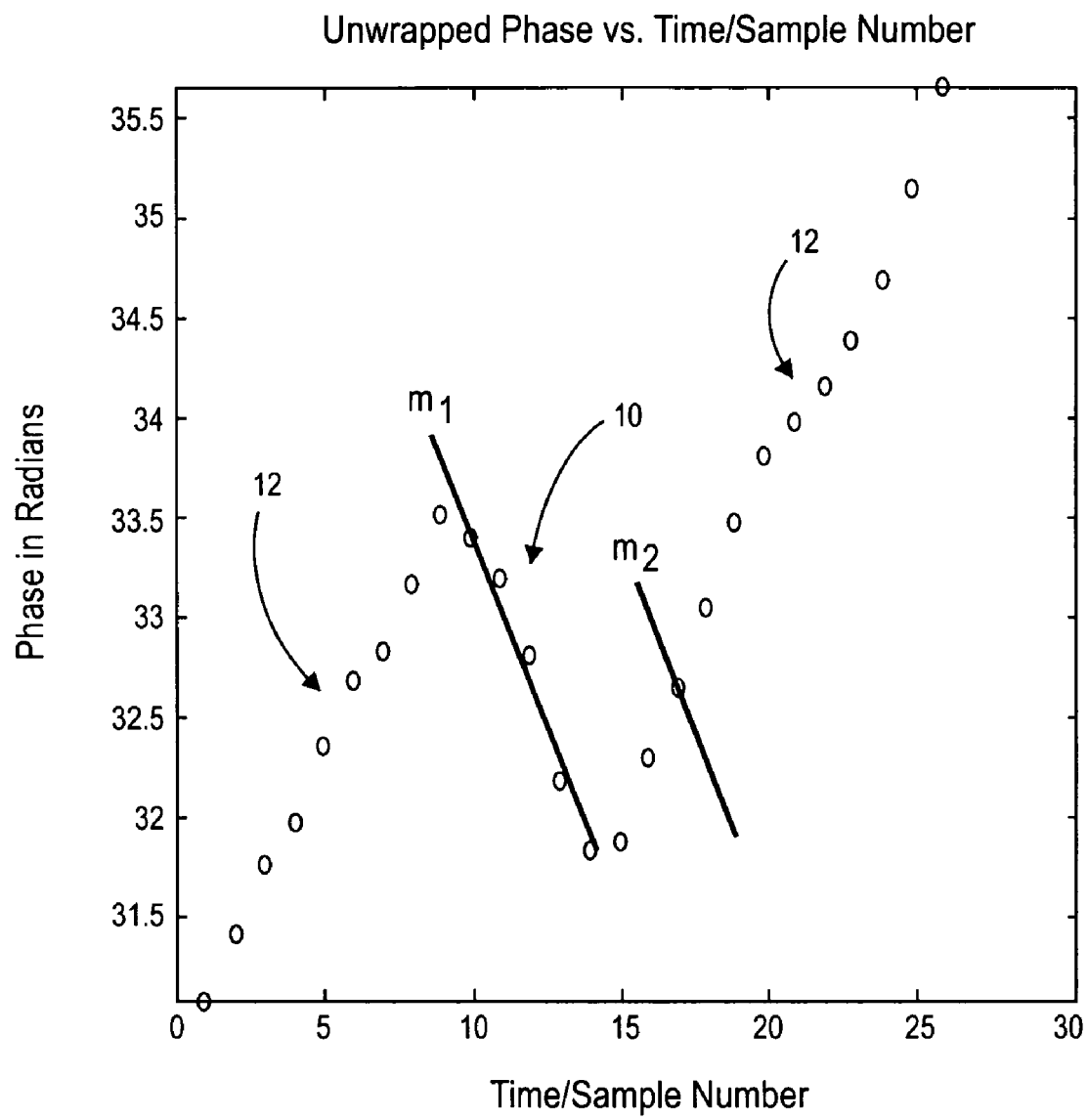
FIG. 3 is a graph of unwrapped phase vs. time/sample number, illustrating a plurality of phase values.

The changes or modulations in the phase of the carrier wave of the PSK signal result in phase transitions 10, as illustrated in FIG. 3. The phase transition 10 is where the phase changes abruptly and either decreases or increases relative to a previous portion of the signal, and the phase transition 10 usually occurs where information is encoded. The phase transition is often, although not always, very short relative to a carrier frequency portion 12 of the signal and is somewhat exaggerated in FIG. 1 for illustrative purposes. The very short phase transition is consequently abrupt or rapid as compared to the carrier frequency portion 12 of the signal. Due to the quick change, the phase transition 10 is a high-frequency event. Simple or inexpensive electronic circuits do not handle high-frequency events well and tend to scatter or disrupt the data. Therefore, the present invention allows for recognition of the phase transition, notwithstanding the above-discussed complications.

To identify the phase transition 10 in the signal, the present invention applies a Radon transform to extract a straight line corresponding to the phase transition. Application of the Radon transform allows extraction of the phase transition even though it may be severely masked by noise. Additionally, because the phase transition is very short as compared to the carrier frequency, the amount of data samples associated with the phase transition is relatively few. The data samples in the phase transition are also often relatively random as compared to the carrier frequency. The present invention recognizes that a Radon transform, which is usually applied only where straight-line events are clearly evident, can be helpful in identifying rapidly changing, scattered phase transitions.

As is well-known in the art, a Radon transform sums data samples that fall on or near a given line, as illustrated in FIG. 3 by the line $m_1$. If the summed value is large, then it implies a heavy concentration of data samples falls on or near the line, and therefore, the chosen line is likely a good "fit" for the data samples, i.e., the line is a good mathematical representation for the data samples. If the summed value is small, as illustrated in FIG. 3 by the line $m_2$, then less data samples fall on or near the line, and therefore, the chosen line is not a strong mathematical representation for the data samples. As is understood by one with ordinary skill in the art, a "good" fit is relative to the desired degree of accurate mathematical representation and is often, although not exclusively, represented by a correlation coefficient. A discussion of the Radon transform as used with the present invention is provided in detail below.

Figure 4:
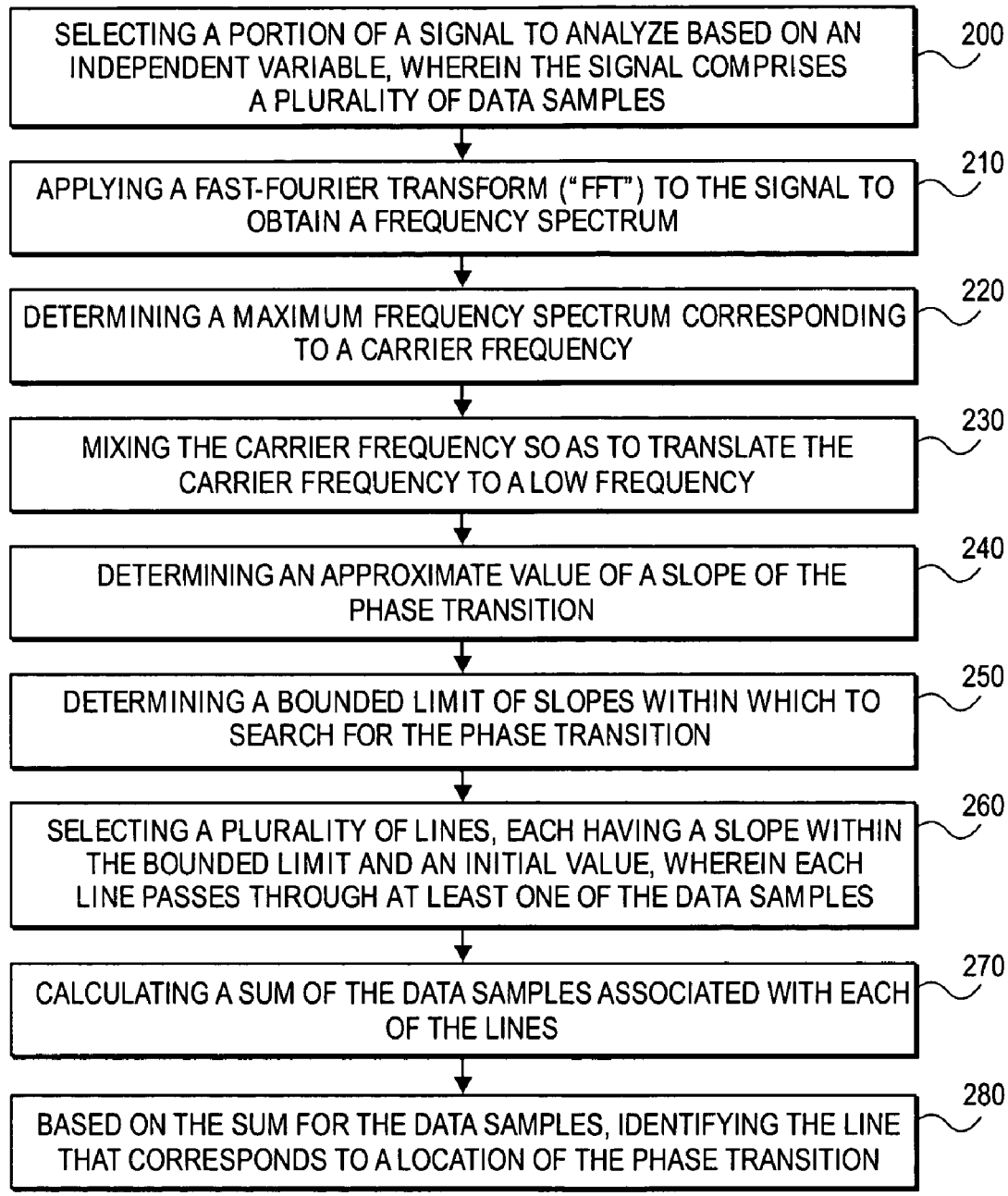
FIG. 4 is a flowchart of a plurality of steps performed for implementing the present invention.

As listed in FIG. 4, the method of the present invention broadly comprises the steps of: selecting a portion of the signal to analyze based on an independent variable, wherein the signal comprises a plurality of data samples (step 200); applying a Fast-Fourier Transform ("FFT") to the signal to obtain the frequency spectrum (step 210); determining a maximum frequency spectrum corresponding to the carrier frequency (step 220); mixing the carrier frequency so as to translate the carrier frequency to a low frequency (step 230); determining an approximate value of a slope of the phase transition (step 240); determining a bounded limit of slopes within which to search for the phase transition (step 250); selecting a plurality of lines, each having a slope within the bounded limit and an initial value, wherein each line passes through at least one of the data samples (step 260); calculating a sum of the data samples associated with each of the lines (step 270); and based on the sum for the data samples, identifying the line that corresponds to a location of the phase transition (step 280). It is understood that these steps need not be performed in the particular order provided.

The method begins with selecting a portion of the signal to analyze based on an independent variable (step 200), such as time or an amount of data contained within the signal. Breaking the signal into discrete segments facilitates processing of the signal and allows for a more accurate analysis. The signal is preferably analyzed every 100 microseconds, with time being the independent variable. The signal may be analyzed more or less often depending on other suitable criteria, such as processing speed of a computer performing the method of the present invention or desired accuracy. Alternatively, the independent variable may be the amount of data contained within the signal. Other suitable independent variables may be used as required. As provided herein, the sample number is the sample at a particular time, and therefore, the Figures provided herein illustrate time/sample number.

Once the portion of the signal to be analyzed is selected, a Fast Fourier Transform ("FFT") is applied to the apportioned signal to obtain the frequency spectrum (step 210), as is well-known in the art. A strongest or maximum signal from the frequency spectrum is referred to as the carrier frequency 12 (step 220). Frequency is well-known as the rate of change of phase, and the rate of change is equivalent to the first derivative or slope of phase. Because frequency is the slope of phase, the carrier frequency 12 often closely corresponds to or is equal to the slope of the phase values with respect to time in between the phase transitions 10, as best illustrated in FIG. 3. Therefore, reference to "carrier frequency" 12 herein is to be understood as the portion of the signal exclusive of the phase transition 10. In broader terms, reference to "non-transition portion" is to be understood as the portion of the signal exclusive of a "transition." Because the phase transitions drop off very rapidly, the slopes of the phase transitions are a negative of the carrier frequency. Further, because the phase transitions usually drop off at a known rate or range of rates, the slopes of the phase transitions can be generally estimated.

As can be understood by one with ordinary skill in the art, the frequency spectrum analysis described above to obtain the carrier frequency produces frequency values at discrete points. Therefore, estimation of the carrier frequency is limited in accuracy by the spacing between adjacent frequency components, commonly referred to as bins. Because the bin spacing is often too wide for the desired accuracy of the carrier frequency, a method for obtaining a much more accurate carrier frequency is provided below. Note that the above method of estimating the carrier frequency could be improved by interpolation, but this is often still not accurate enough for noisy data. Another complication is that the frequency spectrum for a PSK signal is not just purely the spectrum of the carrier frequency. Instead, the obtained frequency spectrum also contains the spectrum of the phase transitions encoded within the signal. Thus, estimation of the carrier frequency from the frequency spectrum is a rough estimation. Notably, this rough estimation is sufficiently close enough that a Radon transform can be applied to obtain the very accurate carrier frequency, as described below.

Prior to applying the Radon transform to obtain the phase transition, the carrier frequency is mixed (step 230). Commonly, after applying the FFT, the carrier frequency has a very high frequency. Analyzing high frequencies is undesirable, however, because the signal must be transmitted at a high sampling rate, which consequently requires a high communication rate. Therefore, mixing of the carrier frequency translates the carrier frequency from a high frequency to a low frequency, thereby allowing for analysis of fewer data samples. Other known methods of reducing the amount of data samples analyzed without degradation of the signal may also be employed.

The Radon transform described below is preferably applied to the unwrapped phase of the signal. The unwrapped phase is where the phase values are not limited to $\pm\pi$ and are allowed to rise or increase continuously, except for in the phase transition area.

To obtain an accurate extraction of the location of the phase transition, a starting approximation for a value of the slope of the phase transition within a bounded limit is first calculated (step 240). Commonly, a slope perpendicular to the carrier frequency is a valid starting approximation. With this known value, a bounded limit for a range of slopes can be calculated (step 250), and the Radon transform can be applied within this bounded limit. Thus, the method comprises performing an iteration process by analyzing summed data samples falling on or near lines having slopes falling within the bounded limit. The bounds of the bounded limit may encompass any desired values, depending on the processor speed of the computer employed to perform the method, a desired accuracy, or other suitable criteria.

Figure 14:
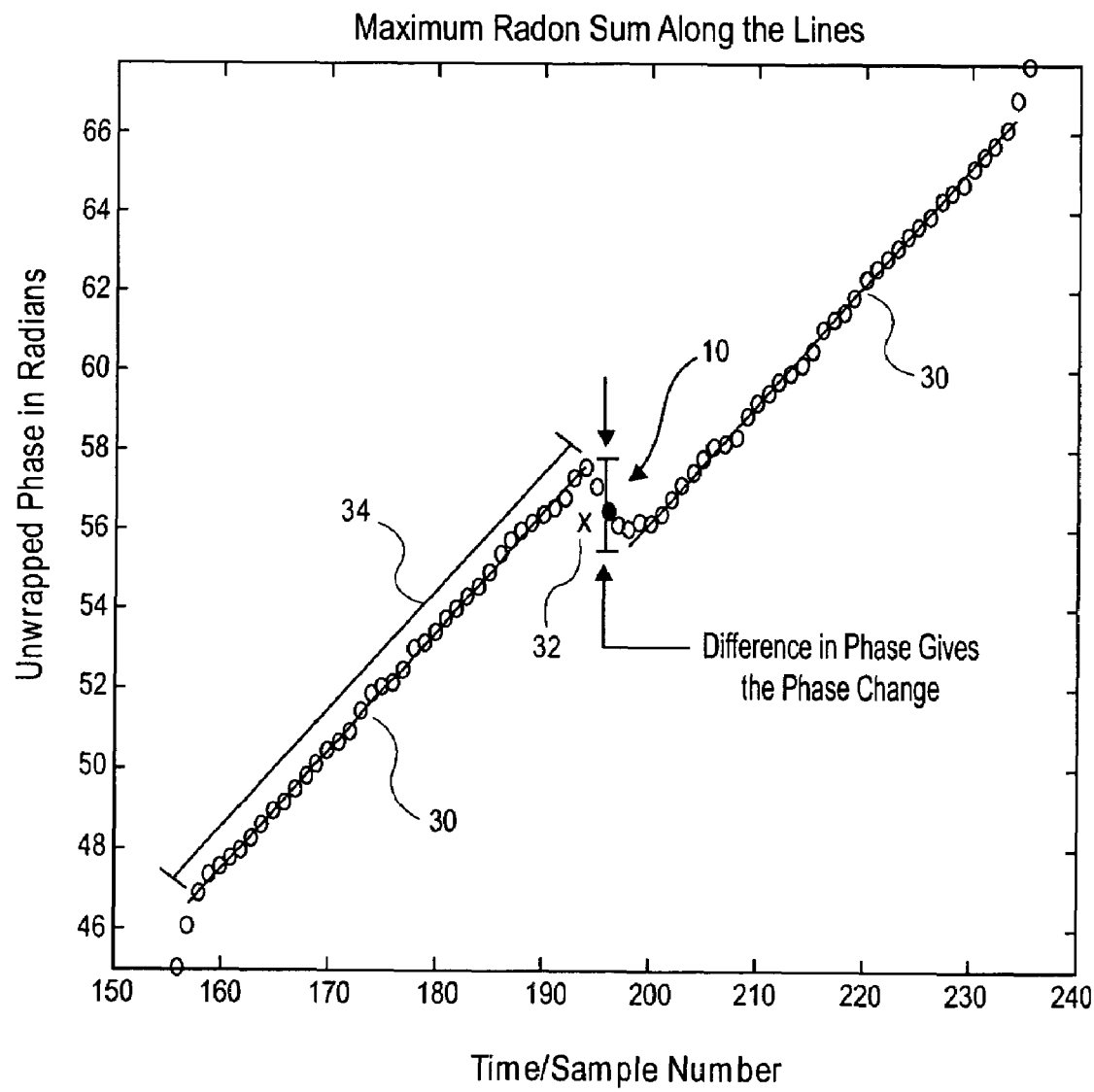
FIG. 14 is a graph illustrating two Radon lines and determination of a change in phase between the Radon lines.

To determine the bounds of the bounded limit, an exemplary method may take upper and lower bounds on either side of the slope perpendicular to the carrier frequency. For example and as illustrated in FIG. 14, if the slope of the non-transition portion 34, which is the carrier frequency 12, is 0.3, then the perpendicular slope is −3.33. The method may then look for slopes bounded within ±20% of the perpendicular slope, such that a lower bound is 20% lower than the perpendicular slope, and an upper bound is 20% higher than the perpendicular slope. Because of filtering effects, these bounds may be skewed accordingly, i.e., the bounds may be rotated counterclockwise for a falling edge and clockwise for a rising edge, with the falling and rising edges defined below with respect to a logic for fitting the data samples to a given line.

An alternative method for calculating the bounds for the slope is based on the slope of the non-transition portion 34, as opposed to the perpendicular slope of the carrier frequency 12. Additionally, the bounds may not be ±20% or even a percentage value but instead may be decided on a case-by-case basis. Further, the calculation of the bounds may account for a highest frequency component and may be processed through a plurality of iterations to adjust for an optimum bound based on an evaluation of the best Radon sum behavior, which is discussed below. As can be appreciated, calculation of the bounded limit of slopes is thus an iterative process, wherein the present method recognizes using the slope of the non-transition portion 34 and perpendicular slope of the carrier frequency 12 as starting points for calculating the bounded limit.

As is understood in the art, a line must have a slope and initial value. Referring generally to FIGS. 7-11, line(s) with given slope(s) are selected to pass through the data sample(s), ($\phi$,t), of the unwrapped phase diagram of FIG. 7, where $\phi$ is the unwrapped phase and t is the time value. This is equivalent to setting an initial value for the line. Such a method is computationally convenient because there is no additional effort needed in mapping the Radon sum, discussed below, to the data samples. Alternatively, initial values may be determined by selecting equally spaced points on the time axis, where the points have the form (0,n$\Delta$t).

Once the bounds for the slope values and the possible initial values are known, a plurality of lines may be selected (step 260). Referring to FIG. 14, an average of the phase values of the first five data samples at the start of the non-transition portion 34 determines where to place a line. Increments of this average phase value either up or down provide a range where the line may be placed.

As noted above, the slope of the non-transition portion 34 is otherwise referred to as the carrier frequency 12. To calculate a very accurate value of the carrier frequency, a Radon transform can be applied to the data samples falling within the non-transition portion 34. Preferably, a relatively large number of data samples may be considered for calculation of the Radon sum. In FIG. 14, to determine the line segment 30, all data samples that fall within the corresponding non-transition portion 34 are considered. These data samples can be easily deduced from the near box-like function of FIG. 11, top graph, from which the start and end of the non-transition portion 34 can be determined. Note that the line segments 30 illustrated in FIG. 14 are useful for (1) a very accurate determination of the carrier frequency; and (2) a magnitude of the phase change, which is discussed in more detail below.

Calculation of the carrier frequency via application of a Radon transform eliminates the influence of the phase transition. The phase transition exists because of encoded information; therefore, if there was no encoded information, there would be no phase transition, and the signal would be purely the carrier frequency. If such is the case, then estimation of the carrier frequency via the FFT frequency spectrum analysis described above would be sufficiently accurate. However, since the present invention addresses recognition and identification of phase transition, the described method of determining an accurate carrier frequency via application of the Radon transform is desirable.

A sum of the data samples, herein referred to as a Radon sum, associated with each of the given lines is determined (step 270), as discussed in more detail below. For illustration purposes, FIG. 3 provides a simple graph of unwrapped phase values plotted against time. The data samples as discussed herein are the phase values, and more or less data samples may be associated with a signal than as illustrated in FIG. 3.

Within the bounded limit of slope values, a plurality of lines with given slopes is selected to pass through the data samples or points. Any data samples lying in proximity to a given line contribute to a weighted sum for the given line, as discussed in more detail below. The line with the best overall behavior is the line that is the best representation of the phase transition 10 and therefore, is the final solution to the occurrence of the phase transition (step 280). Determination of what quantifies as the best behavior is further discussed below.

Figure 5:
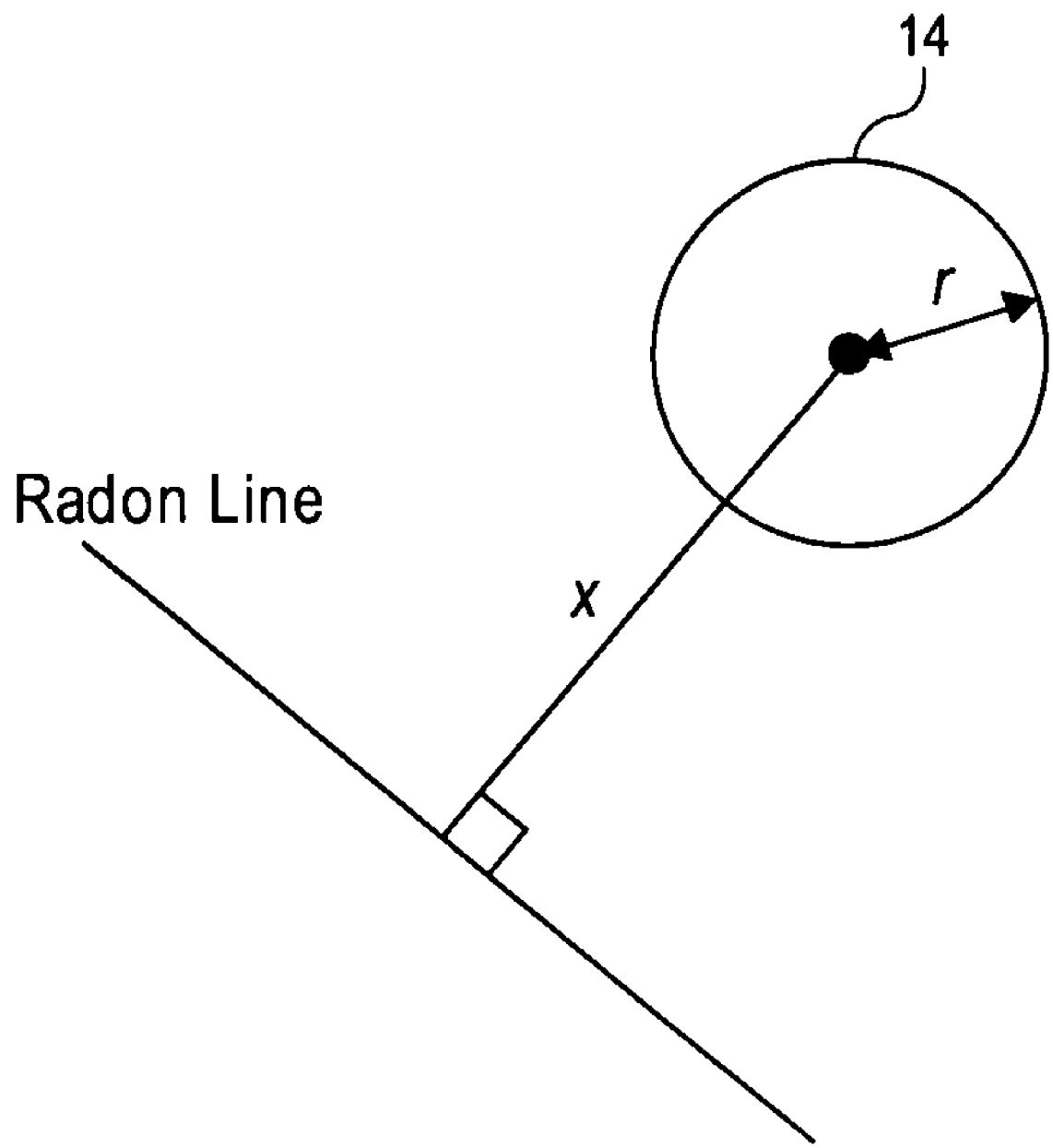
FIG. 5 is a graph illustrating a data sample falling near a Radon line and further illustrating a distribution disc for determining a weighted value of the data sample with respect to the Radon line.

Preferably, the sum for the data values is a weighted sum, wherein for any given line, each of the data samples that fall on or near the given line is "smeared," such that a disc 14 of a given distribution is centered on the data sample, as best illustrated in FIG. 5. The given distribution may be any well-known statistical distribution, such as, for example, a Gaussian distribution. The greatest value of the Gaussian distribution of the disc 14 at the intersection with the line is a weighted value of the data sample. In FIG. 5, for example, the distributions associated with the data sample are D(r), where r is the radial distance from the data sample. (The distance of the data sample from the line and the disc 14 is exaggerated in FIG. 5 for ease of reading). The smallest distance between the data sample and the given line is x. The contribution of this data sample to the weighed sum is then D(x). The distribution should be chosen such that as r increases, the value of the function D(r) decreases, such as, for example, a Gaussian distribution centered at the data sample. The weighted sum may be determined by any of several well-known methods and need not be limited to the above-described method.

Figure 6:
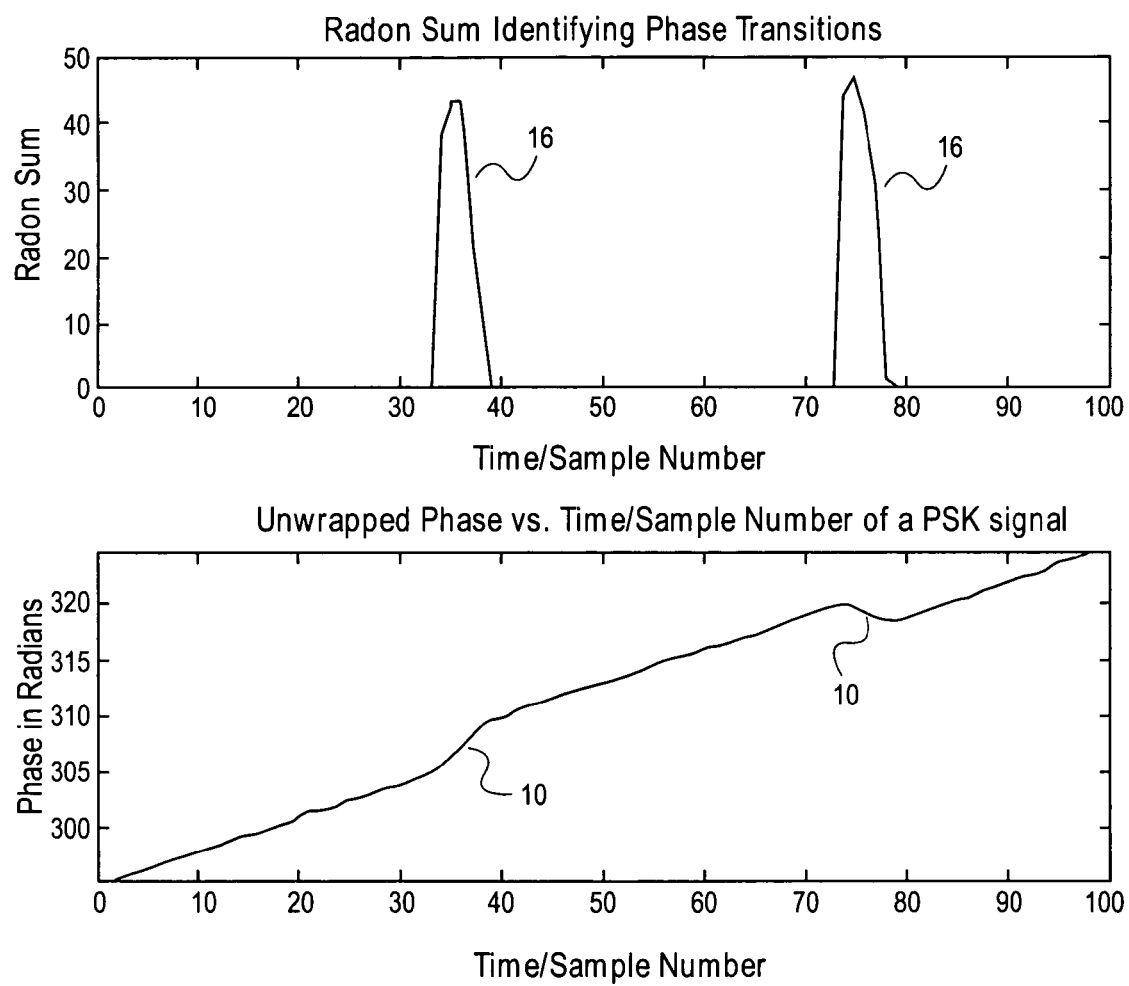
FIG. 6 is a set of graphs illustrating a weighted sum for the Radon line corresponding to a phase transition and a location of the phase transition in an unwrapped phase vs. time/sample number graph.

Any of several methods may be employed to determine the line with the best overall behavior, i.e., the line that best fits or models the data samples. For example, the line that best models the data samples may be obtained by selecting the line with a maximum weighted sum amongst all the lines analyzed within the bounded limit. As illustrated in FIG. 6, the weighted sum for each phase transition corresponds to peaks 16 in the graph entitled "Radon Sum Identifying Phase Transitions," and the phase transitions 10 coincide with the peaks 16 when compared against the graph entitled "Unwrapped Phase vs. Time/Sample Number of a PSK Signal." An alternative method of obtaining the line with the best overall behavior may comprise selecting the largest mean of the weighted sum for all the phase transitions, with the smallest standard deviations of the weighted sum for a given slope or line.

The present invention also includes a logic for fitting the data samples to a given line. In particular, Radon sums are computed using three ranges of slope, referred to as a falling edge slope, a rising edge slope, and a level slope. The falling edge slope is where the phase transition is decreasing (the falling edge region), and the rising edge slope is where the phase transition is increasing (the rising edge region). The level slope corresponds to a slope of the non-transition portion 34 of the signal (the non-transition region), otherwise referred to as the carrier frequency 12. It is called the "level" slope because during this portion, the slope is usually constant, i.e., neither increasing or decreasing.

Figure 7:
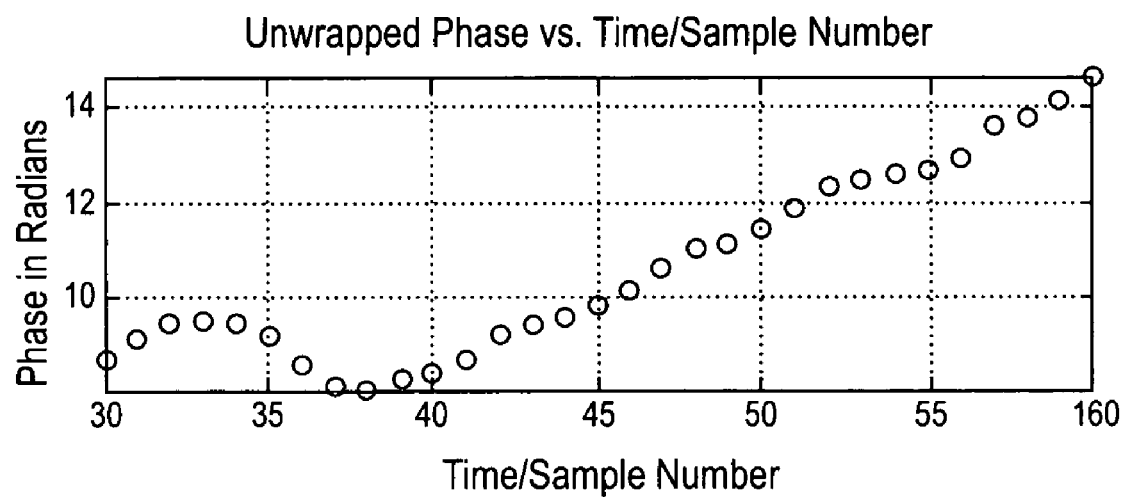
FIG. 7 is a graph of unwrapped phase values vs. time/sample number.

FIG. 7 illustrates a graph of a plurality of unwrapped phase values plotted against time. The individual phase values or data samples will be referred to by their time location. For example, sample number 33 is located at t=33, on the graph of FIG. 7. For each data sample, a line is drawn through the sample, and a Radon sum is determined for the line. In particular, for each line through each data sample, the Radon sum is obtained by summing the contributions of the two points preceding the data sample and the two points subsequent to the data sample. As can be understood, the Radon sum could be determined by further summing the data sample itself; however, because each data sample lies on the line, the contribution of the data sample to the particular line would be the same for all data samples.

To determine in which region a particular data sample lies, the following logic is applied, where $F(t)$ is the Radon sum for the falling edge; $R(t)$ is the Radon sum for the rising edge; and $L(t)$ is the Radon sum for the level portion, for all t=time. Similarly, $f(t)$ is the value of a data sample that fits the falling edge; $r(t)$ is the value for a data sample that fits the rising edge; and $l(t)$ is the value for a data sample that fits the level portion. The functions $f(t)$, $r(t)$, and $l(t)$ are then updated by the following logic:

$f(t)=F(t)$, if $F(t)>L(t)$ and $F(t)>R(t)$ Otherwise, $f(t)=0$;

$r(t)=R(t)$, if $R(t)>L(t)$ and $R(t)>F(t)$ Otherwise, $r(t)=0$; and $l(t)=L(t)$, if $L(t)>R(t)$ and $L(t)>F(t)$ Otherwise, $l(t)=0$.

Figure 8:
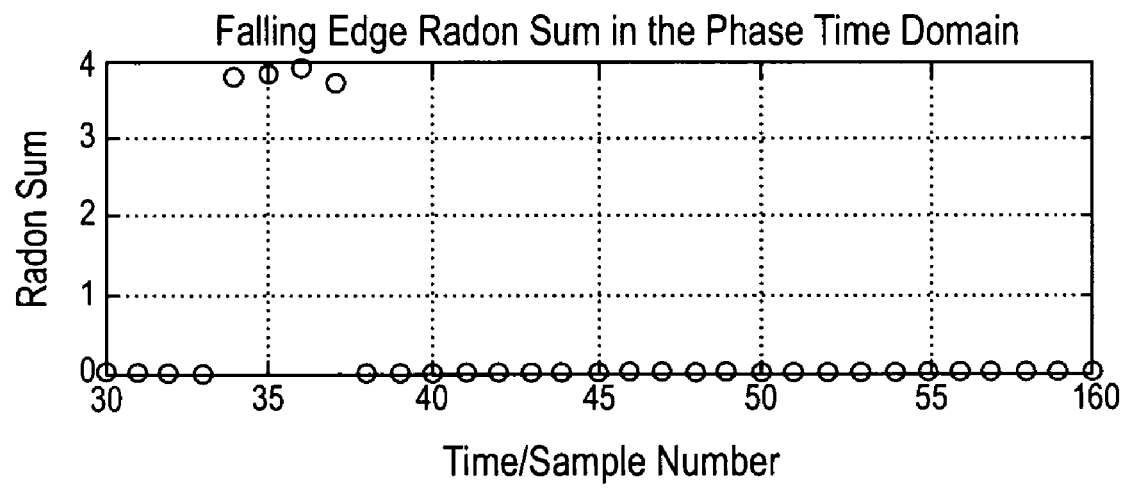
FIG. 8 is a graph illustrating a falling edge Radon sum of the unwrapped phase values of FIG. 7.

FIG. 8 illustrates a graph of the falling edge radon sum, $f(t)$. Taking sample 33 again, $L(t)$ is largest as compared to $F(t)$ and $R(t)$, and therefore, $l(t)=L(t)$. Thus, sample 33 fits the slope for the non-transition portion better than any other slopes and should therefore belong to the non-transition portion. For the graph of FIG. 8, the data samples not belonging to the falling edge region are assigned a Radon sum of 0, according to the logic.

Figure 9:
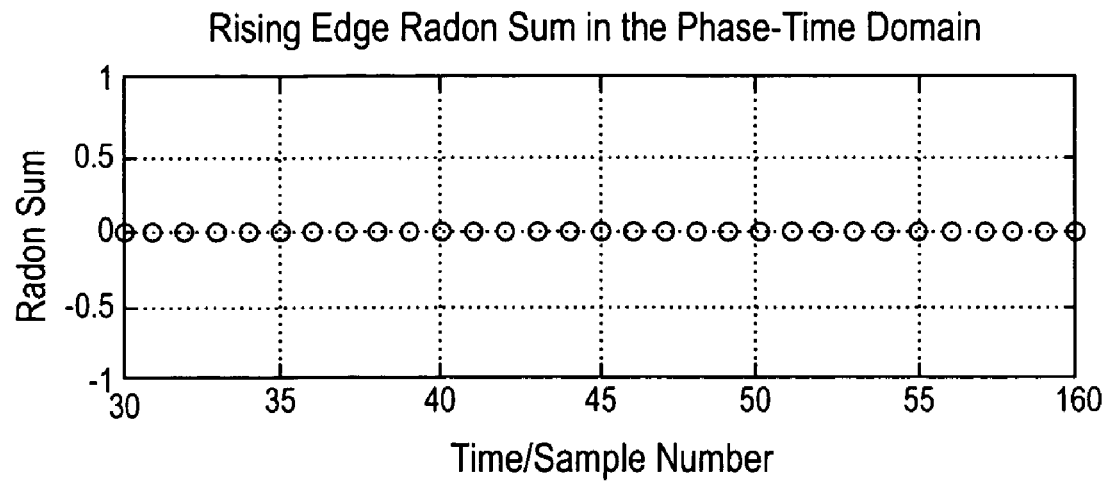
FIG. 9 is a graph of a rising edge Radon sum of the unwrapped phase values of FIG. 7.
Figure 10:
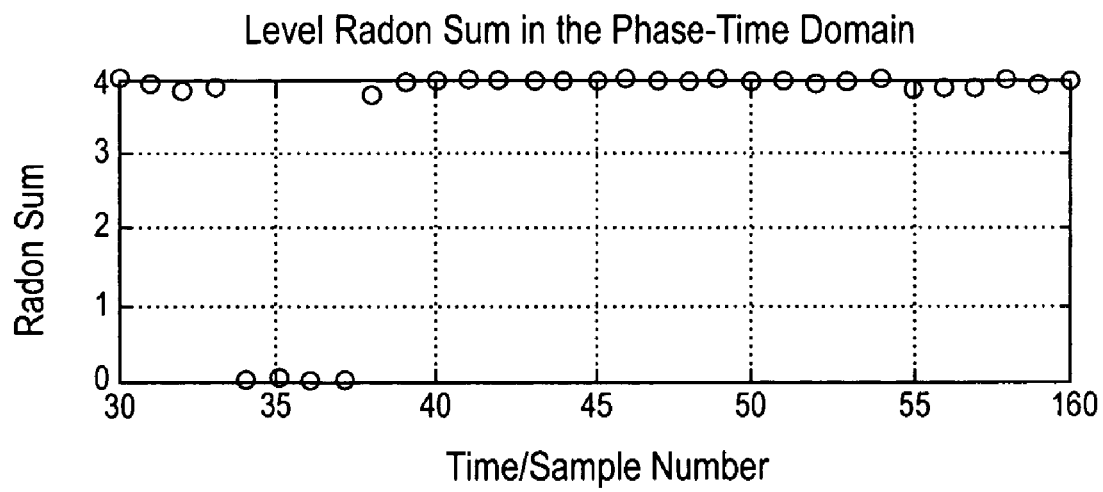
FIG. 10 is a graph of a level Radon sum of the unwrapped phase values of FIG. 7.

FIGS. 9 and 10 show similar graphs for the rising edge and level portions. FIG. 9 illustrates the Radon sum for the rising edge for each data sample, $r(t)$. As can be seen, the Radon sum is 0 for all data samples illustrated in the unwrapped phase of FIG. 7. This is because there is no rising edge in the phase values provided in FIG. 7.

FIG. 10 illustrates the level Radon sum, $l(t)$, that is where the slope is constant. As noted above, a level Radon sum corresponds to a non-transition portion of the signal. As can be seen in FIG. 10, only the data samples contributing to the falling edge are assigned a value of 0 according to the above logic.

Figure 11:
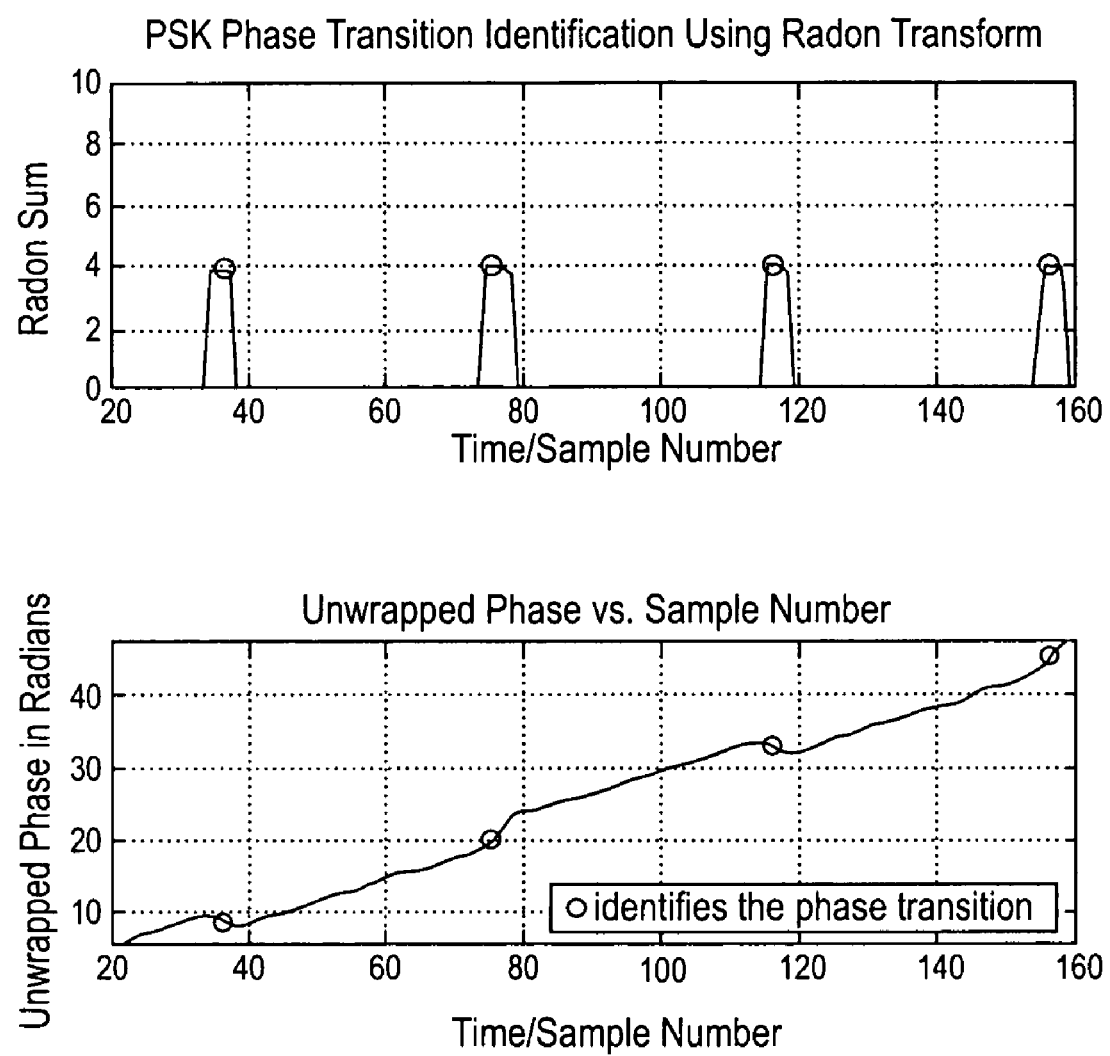
FIG. 11 is a graph illustrating identification of the phase transition from application of the present invention.

FIG. 11 provides two graphs, wherein the top graph illustrates the result of combining the falling edge Radon sum function $f(t)$ and the rising edge $r(t)$. As can be seen, the phase transitions are illustrated by the box-like peaks. The bottom graph of FIG. 11 illustrates the unwrapped phase values of the top graph, and a comparison between the unwrapped phase values can be made to the top graph of FIG. 11.

Once the line exhibiting the best overall behavior, i.e., the line that is the best fit or model of the data samples for the phase transition, is known, the data samples associated with the line and that otherwise fall on or near to the line, herein referred to as the Radon line, are known to make up the phase transition. From the extracted phase transitions, a time interval between consecutive phase transitions can also be obtained. A clustering program may then be used to determine a minimum time interval, which is referred to as the element length. The inverse of the element length then provides a baud rate or simply "baud."

Figure 12:
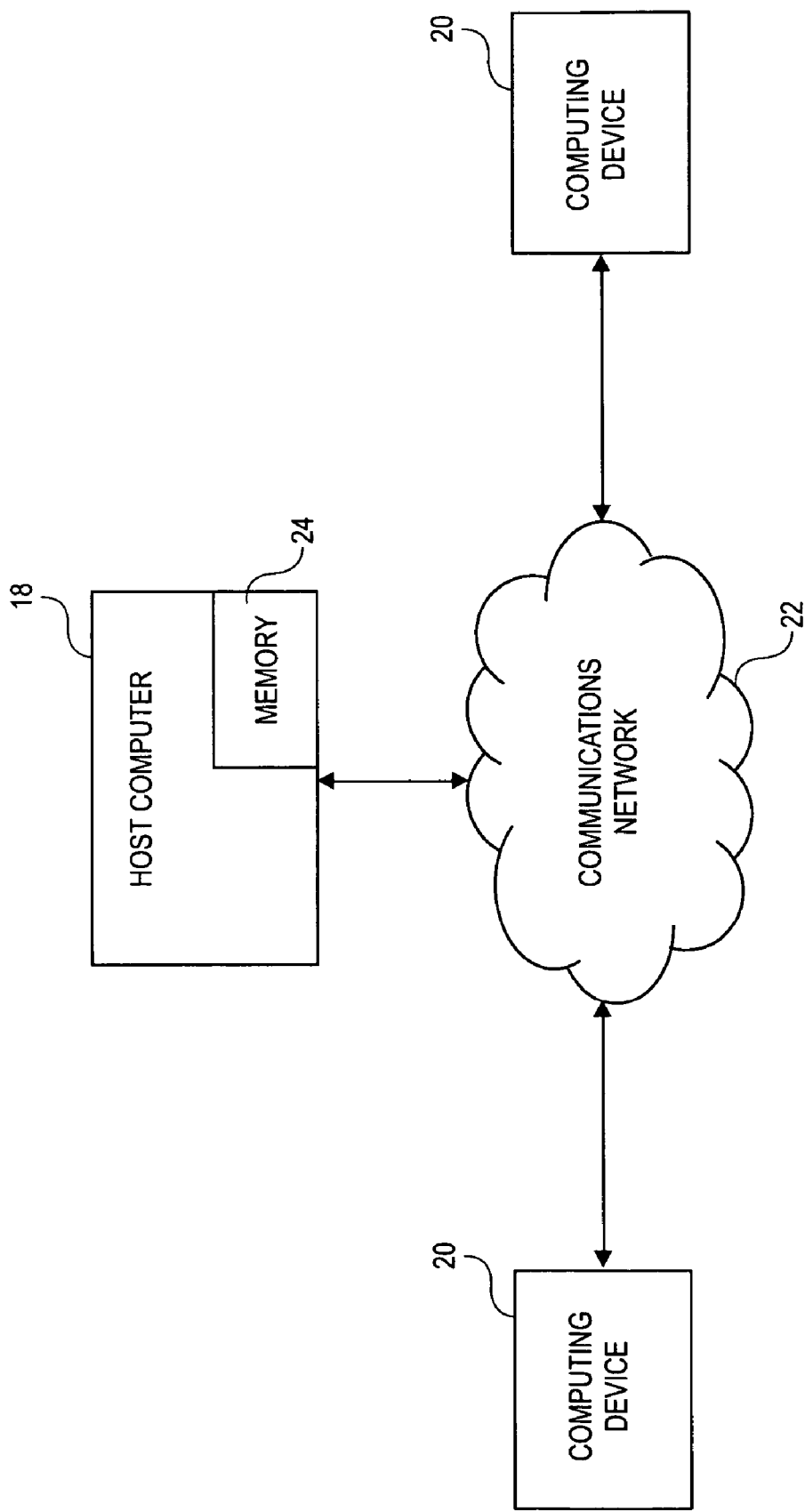
FIG. 12 is a block diagram of the components for implementing the method of the present invention.

The above-described method can be implemented in hardware, software, firmware, or a combination thereof. In a preferred embodiment, however, the method is implemented with a computer program operated by a host computer 18 or other computing element, as illustrated in FIG. 12. The host computer 18 may be in communication with a plurality of computing devices 20 via a communications network 22 and may be any computing device, such as a network computer running Windows NT, Novel Netware, Unix, or any other network operating system. The computer program and host computer 18 illustrated and described herein are merely examples of a program and computer that may be used to implement the present invention and may be replaced with other software and computers or computing elements without departing from the scope of the present invention.

The computer program of the present invention is stored in or on computer-readable medium 24 residing on or accessible by the host computer 18 for instructing the host computer 18 to execute the computer program of the present invention described herein. The computer program preferably comprises an ordered listing of executable instructions for implementing logical functions in the host computer 18. The executable instructions may comprise a plurality of code segments operable to instruct the computer 18 to perform the method of the present invention. It should be understood herein that one or more steps of the present method may be employed in one or more code segments of the present computer program. For example, a code segment executed by the computer may include one or more steps of the inventive method.

The computer program may be embodied in any computer-readable medium 24 for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" 24 may be any means that can contain, store, communicate, propagate or transport the program for use by or in connection with the instruction execution system, apparatus, or device. The computer-readable medium 24 can be, for example, but not limited to, an electronic, magnetic, optical, electromagnetic, infrared, or semi-conductor system, apparatus, device, or propagation medium. More specific, although not inclusive, examples of the computer-readable medium 24 would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium 24 could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Although the invention has been described with reference to the preferred embodiment illustrated in the attached drawing figures, it is noted that equivalents may be employed and substitutions made herein without departing from the scope of the invention as recited in the claims. For example, although the present invention has been specifically discussed with respect to PSK and FSK signals, the present invention is applicable to any signal having a phase or frequency transition.

The phase transitions may also be obtained by computing a best fit line for consecutive groups of data samples, wherein the number of data samples is n. The consecutive groups may be separated by a number of m data samples, and preferably n>m. A slope of the best fit line is then plotted against time, and peaks in the plot correspond to the phase transitions.

The present invention has been discussed with application of a Radon transform. As is well-known in the art, the Hough transform is related to the Radon transform. (See M. van Ginkel, C. L. Luengo Hendriks, and L. J. van Vliet, *A Short Introduction to the Radon and Hough Transforms and How They Relate to Each Other*, Technical Report QI-2004-01, Quantitative Imaging Group, Delft University of Technology, February 2004, 1-11). The Hough transform can thus also be used to extract phase transitions from a signal. In applying the Hough transform, the method and computer program of the present invention iterates through each data sample for a given slope, wherein it is known the slope lies within a bounded limit, as discussed above. The contribution of the data sample to a weighted sum is then projected onto an axis, and the weighted sum for each line is then transformed onto a time axis. The line having the highest weighted sum is determined, and peaks along this line identify phase transitions. Because application of the Hough transform iterates through individual data samples, as opposed to iterating through all data samples that fall on or near a given line, the Hough transform is especially advantageous for a sparse data array.

Figure 13:
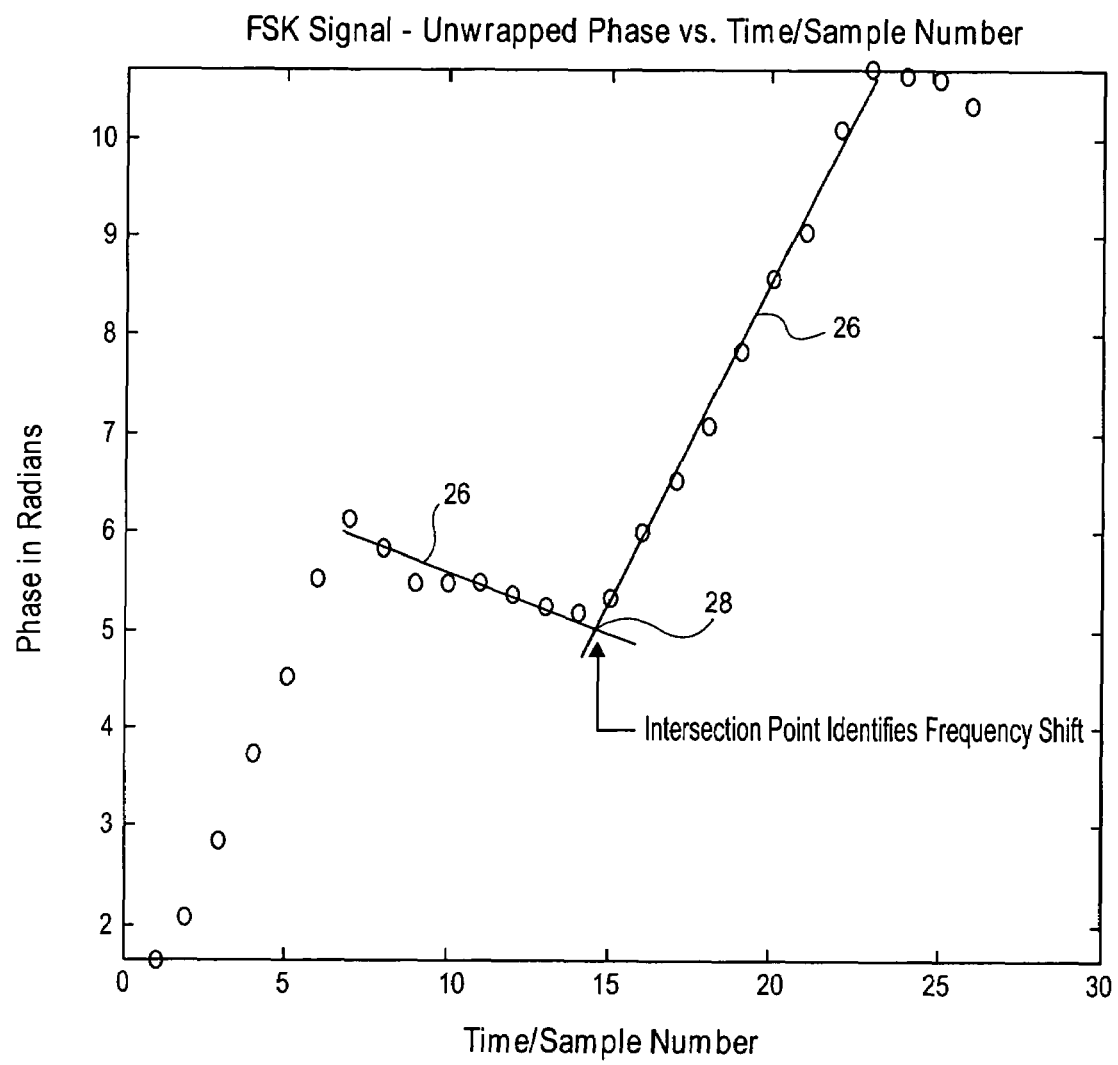
FIG. 13 is a graph illustrating a frequency shift in an unwrapped phase vs. time/sample number graph.

As noted above, the present invention is also operable to detect frequency transitions or shifts in FSK signals. In an unwrapped phase vs. time/sample number graph, such as is illustrated in FIG. 13, the slope of a line 26 drawn through a set of data samples is the frequency for the set of data samples. A frequency transition 28 thus occurs where the phase changes from increasing to decreasing, or from decreasing to increasing, i.e., where the slope of consecutive sets of data samples changes.

The line fitted to the data samples is found by applying a Radon or Hough transform, as described above for extracting a phase transition. For two consecutive sets of data samples, two lines are found via the Radon transform, as illustrated by the solid lines 26 in FIG. 13. For the case of coherent FSK signals with a smooth phase transition, i.e., where there is no phase discontinuity, the intersection of the lines is the location of the frequency transition. Application of the Radon or Hough transform then allows for a determination of the mark frequency or space frequency, and an element length can then be determined by identification of the shortest mark or space period. For non-coherent FSK signals where both the frequency transition and the phase transition occur abruptly at the same instance, the lines obtained via application of the Radon or Hough transforms also identify such frequency or phase transitions. Because the slope of the line(s) fall outside the frequency range expected for the FSK signal, identification of a line modeling the frequency or phase transition is facilitated.

The use of the Radon transform and Hough transform discussed herein can be extended to multi-phase PSK signals and multi-frequency FSK signals. Additionally, the method and computer program described herein can be generalized to curved events.

The present invention is also operable to determine a frequency and change in phase of the PSK signal between consecutive phase transitions. From the unwrapped phase vs. time/sample number domain, as illustrated in FIG. 3, a Radon transform with a range of slopes can be applied to approximate the frequency of the PSK signal. As noted above, frequency is the rate of change of phase. Therefore, for the unwrapped phase values, the slope of the phase values is the frequency. A bounded limit or range of slope values is obtained from the PSK signal by knowing the carrier frequency via the frequency spectrum analysis discussed above. Similarly, a bounded limit of initial values is obtained by averaging the phase values after the starting edge, as also discussed above. To determine a more accurate frequency, a plurality of lines having the range of slopes and initial values within the bounded limits may be applied to the unwrapped phase values to determine a line that has the greatest or maximum sum, i.e., the line that has the largest number of data samples that fall on or near the line. The line that gives the maximum sum has the slope that corresponds to the frequency of the PSK signal. A weighted sum can also be determined as described above, and the line having the largest weighted sum may then correspond to the frequency of the PSK signal. Frequencies obtained for each non-transition portion can further be averaged to yield more accurate values that are less affected by noise.

In FIG. 14, unwrapped phase values are plotted on a phase vs. time graph. The two solid lines 30 correspond to two consecutive periods. These solid lines are determined via application of the Radon transform, as discussed above. The phase transition 10 lies between the periods, and a distance x between the two solid lines measured along the vertical axis gives a magnitude of the change in phase between the two periods, referred to as reference numeral 32. For the particular phase values illustrated in FIG. 14, the change in phase is approximately equal to $\pi$.

Similar to extracting the phase transition, a Hough transform can be used to find the best-fit lines, and such is useful for a sparse data array. Further, linear regression techniques, such as a chi-square measure, to obtain a best straight line fit could be used. Unlike for finding the phase transition, data samples for finding the best-fit lines for the non-transition portion may include all data samples between the start and end of the non-transition portion. The start and end of the non-transition portion are where the transition zone begins and ends, respectively, and could easily be inferred from the near box-like functions illustrated in FIG. 11, top graph.

The following is an alternative and computationally simpler method of finding a change in phase between neighboring periods. As is well known, the signal will have a certain period, and an initial value of the line for the frequency of the PSK signal also corresponds to the phase of the period. Thus, the phase value can be compared to obtained phase values for neighboring periods, and from this a change in phase between neighboring periods can be computed.

Having thus described the preferred embodiment of the invention, what is claimed as new and desired to be protected by Letters Patent includes the following:

1. A system for identifying at least one phase transition in a phase-shift keying signal comprising a plurality of data samples corresponding to phase values, the system comprising:

a memory operable to store computing device executable instructions; and
a computing device operable to
select a portion of the signal to analyze;
apply a transform to the signal to obtain a frequency spectrum;
determine a maximum frequency spectrum corresponding to a first carrier frequency;
determine a starting approximation value of a slope of the phase transition;
calculate a bounded limit of slopes within which to search for the phase transition;
select a plurality of lines, each having a slope within the bounded limit and an initial value, wherein each line passes through at least one of the data samples;
calculate a sum for the data samples associated with each of the lines;
based on the sum for the data samples, identify a line that corresponds to a location of the phase transition;
determine a second carrier frequency corresponding to a second non-transition portion after the phase transition; and
calculate a magnitude of a change in phase by determining a vertical distance of the phase transition lying between the first carrier frequency, which corresponds to a first non-transition portion before the phase transition, and the second carrier frequency.

2. The system as claimed in claim 1, wherein the portion of the signal to be analyzed is based on an independent variable, such that the signal is broken into a plurality of discrete segments.

3. The system as claimed in claim 2, wherein the independent variable is time.

4. The system as claimed in claim 2, wherein the independent variable is an amount of data contained within the signal.

5. The system as claimed in claim 1, wherein the transform is a Fast-Fourier Transform.

6. The system as claimed in claim 1, wherein the computing device is further operable to mix the first carrier frequency so as to translate the first carrier frequency to a low frequency.

7. The system as claimed in claim 1, wherein the starting approximation for the value of the slope of the phase transition is a slope perpendicular to the carrier frequency.

8. The system as claimed in claim 7, wherein the bounded limit for the slope is between +20% of the slope perpendicular to the first carrier frequency and −20% of the slope perpendicular to the first carrier frequency.

9. The system as claimed in claim 1, wherein the sum for the data samples is a weighted sum calculated via a statistical distribution.

10. The system as claimed in claim 9, wherein the line that corresponds to a location of the phase transition is the line with a maximum weighted sum amongst all the lines analyzed within the bounded limit.

11. The system as claimed in claim 9, wherein the line that corresponds to a location of the phase transitions is the line having a largest mean of the weighted sum.

12. The system as claimed in claim 1, wherein the method is applied to an unwrapped phase, such that the phase values of the carrier frequency are not limited to $+\pi$ and $-\pi$.

13. The system as claimed in claim 1, wherein the computing device is further operable to determine a baud of the signal by calculating a time interval between consecutive phase transitions, applying a clustering program to determine a minimum time interval, and calculating the inverse of the minimum time interval to obtain the baud.

14. A physical computer-readable medium comprising a set of computing element instructions for identifying at least one phase transition in a phase-shift keying signal comprising a plurality of data samples corresponding to phase values, the computer-readable medium comprising:

- a code segment operable to be executed by the computing element for selecting a portion of the signal to analyze;
- a code segment operable to be executed by the computing element for applying a transform to the signal to obtain a frequency spectrum;
- a code segment operable to be executed by the computing element for determining a maximum frequency spectrum corresponding to a first carrier frequency;
- a code segment operable to be executed by the computing element for determining a starting approximation value of a slope of the phase transition;
- a code segment operable to be executed by the computing element for calculating a bounded limit of slopes within which to search for the phase transition;
- a code segment operable to be executed by the computing element for selecting a plurality of lines, each having a slope within the bounded limit;
- a code segment operable to be executed by the computing element for calculating a sum for the data samples associated with each of the lines;
- a code segment operable to be executed by the computing element for identifying a line that corresponds to a location of the phase transition based on the sum for the data samples;
- a code segment operable to be executed by the computing element for determining a second carrier frequency corresponding to a second non-transition portion after the phase transition; and
- a code segment operable to be executed by the computing element for calculating a magnitude of a change in phase by determining a vertical distance of the phase transition lying between the first carrier frequency, which corresponds to a first non-transition portion before the phase transition, and the second carrier frequency.

* * * * *